US011974370B2

(12) United States Patent
Gao et al.

(10) Patent No.: US 11,974,370 B2
(45) Date of Patent: Apr. 30, 2024

(54) LIGHTING DEVICE AND METHOD FOR ADJUSTING LIGHT ATTRIBUTE OF THE SAME

(71) Applicant: SAVANT TECHNOLOGIES LLC, Cleveland, OH (US)

(72) Inventors: Jie Gao, Shanghai (CN); Kun Xiao, Shanghai (CN); Yankun Gong, Shanghai (CN); Pan Yao, Shanghai (CN); Jia Zhu, Shanghai (CN)

(73) Assignee: SAVANT TECHNOLOGIES LLC, Cleveland, OH (US)

( * ) Notice: Subject to any disclaimer, the term of this patent is extended or adjusted under 35 U.S.C. 154(b) by 0 days.

(21) Appl. No.: 17/827,600

(22) Filed: May 27, 2022

(65) Prior Publication Data

US 2022/0295614 A1 Sep. 15, 2022

Related U.S. Application Data

(63) Continuation-in-part of application No. 17/365,562, filed on Jul. 1, 2021, now Pat. No. 11,405,994.

(30) Foreign Application Priority Data

Jul. 27, 2020 (CN) ........................ 202021505560.X

(51) Int. Cl.
*H05B 45/10* (2020.01)
*H05B 45/20* (2020.01)
(Continued)

(52) U.S. Cl.
CPC ............. *H05B 45/30* (2020.01); *H05B 45/10* (2020.01); *H05B 45/20* (2020.01); *H05B 47/155* (2020.01); *H05B 47/17* (2020.01)

(58) Field of Classification Search
CPC ........ H05B 45/10; H05B 45/20; H05B 45/30; H05B 47/10; H05B 47/17; H05B 47/155
See application file for complete search history.

(56) References Cited

U.S. PATENT DOCUMENTS 8,810,141 B2 * 8/2014 Takeda .................. H05B 45/60 315/192
10,234,091 B1 3/2019 Chaimberg et al.
(Continued)

FOREIGN PATENT DOCUMENTS

CN 204345574 U 5/2015
WO 2020051827 A1 3/2020

*Primary Examiner* — Jimmy T Vu
(74) *Attorney, Agent, or Firm* — WOOD IP LLC

(57) ABSTRACT

Disclosed herein is a lighting device with adjustable technical effects using few extraction electrodes to keep the cost low and the device simple, the device including: at least one filament group, wherein each filament group includes at least one filament, each filament includes at least one first light emitting unit and at least one second light emitting unit, which are connected in anti-parallel, and the first light emitting unit and the second light emitting unit have different light attributes from each other; and a light attribute adjusting unit, which is connected to both ends of each filament group to adjust a light attribute of light emitted from the lighting device, wherein the light attribute of the emitted light can be different from the light attribute of any light emitting unit.

15 Claims, 5 Drawing Sheets

(51) Int. Cl.
*H05B 45/30* (2020.01)
*H05B 47/155* (2020.01)
*H05B 47/17* (2020.01)

(56) References Cited

U.S. PATENT DOCUMENTS

| | | | | |
|---|---|---|---|---|
| 10,750,592 | B1 * | 8/2020 | Price | H05B 45/37 |
| 2004/0080941 | A1 | 4/2004 | Jiang et al. | |
| 2013/0009560 | A1 * | 1/2013 | Takeda | H05B 45/60<br>315/201 |
| 2022/0030682 | A1 | 1/2022 | Gao et al. | |

* cited by examiner

LIGHTING DEVICE AND METHOD FOR ADJUSTING LIGHT ATTRIBUTE OF THE SAME

CROSS-REFERENCE TO RELATED APPLICATIONS

This application is a continuation-in-part of co-pending U.S. patent application Ser. No. 17/365,562, filed Jul. 1, 2021, which claims benefit of Chinese Patent Application Serial Number 202021505560.X, filed Jul. 27, 2020. Each of the aforementioned related patent applications is herein incorporated by reference.

TECHNICAL FIELD

The present application relates to a lighting device, and more particularly, to an improved lighting device with adjustable light attributes.

BACKGROUND

Filament lamps capable of adjusting colors and color temperatures (e.g., smart bulbs provided with LEDs on filaments thereof) have been developed to adapt to the requirements for smart lighting. However, in the prior art, in order to realize a filament lamp capable of emitting various colored light, an arrangement in which five filament guide wires (one is a common anode, and the remaining four are cathodes of four LEDs, each LED represents one color) pass through a lamp post and are intertwined is usually adopted. Since it is necessary to pass the five filament guide wires through the narrow lamp post, the electric welding process is difficult, and the risk of air leakage from the bulb is high. Moreover, flexible filaments used for the intertwined five filament guide wires are expensive, and hundreds of flip chips need to be arranged on each filament, such that the manufacturing cost is very high.

Therefore, there is a need to develop an improved filament lamp with low price, simple process, and adjustable color and color temperature, so that the improved filament lamp can be applied in a large scale.

SUMMARY

The present application is proposed in view of the above problems, and the main purpose of the present application is to provide a lighting device to at least solve the technical problem in the prior art that it is difficult to implement a lighting device which is capable of adjusting light attributes, while simple in process and low in manufacturing cost.

In order to achieve the above purpose, according to one aspect of the present application, a lighting device is provided, including: at least one filament group, wherein each filament group includes at least one filament, each filament includes at least one first light emitting unit and at least one second light emitting unit, which are connected in anti-parallel, and the first light emitting unit and the second light emitting unit have different light attributes from each other; and a light attribute adjusting unit, which is connected to both ends of each filament group to adjust a light attribute of light emitted from the lighting device, wherein the light attribute of the emitted light can be different from the light attribute of any light emitting unit.

In this way, the light attribute of the light emitted from the lighting device can be adjusted by using the light attribute adjusting unit, so that the light attribute of the light emitted from the lighting device is different from the light attribute of any light emitting unit.

Further, according to an embodiment of the present application, the light attribute adjusting unit adjusts the light attribute of the light emitted from the lighting device by controlling the on/off state and a turn-on duration in the on-state of the first light emitting unit and the second light emitting unit in each filament group.

In this way, the light attribute of the light emitted from the lighting device can be adjusted by controlling the on/off state and the turn-on duration in the on-state of each light emitting unit in each filament group, so that the light attribute of the light emitted from the lighting device is different from the light attribute of any light emitting unit.

Further, according to an embodiment of the present application, each filament group has a first end and a second end, and the light attribute adjusting unit is connected to the first end and the second end of each filament group.

In this way, by using the light attribute adjusting unit that is connected to the first end and the second end of each filament group, it is possible to realize that the light attribute of the light emitted from the lighting device is different from the light attribute of any light emitting unit.

Further, according to an embodiment of the present application, each filament group includes several identical filaments, and the several identical filaments are connected in series or in parallel.

In this way, the number of filaments in each filament group, and thus the number of the first light emitting units and the second light emitting units in each filament group can be arbitrarily expanded, so as to facilitate the lighting device to emit light with desired brightness.

Further, according to an embodiment of the present application, the at least one filament group includes a first filament group and a second filament group, any light emitting unit in the first filament group and any light emitting unit in the second filament group have different light attributes from each other, and at any timing, only the first light emitting unit or the second light emitting unit in one filament group in the lighting device is turned on, and the second end of the first filament group and the first end of the second filament group are connected to each other and are commonly connected to the light attribute adjusting unit.

In this way, when the lighting device includes two or more filament groups, two light emitting units from any two different filament groups have different light attributes. Moreover, the filament groups of the lighting device can be connected to the light attribute adjusting unit by a smaller number of guide wires (the number of guide wires is equal to the number of filament groups plus 1), so that the assembly process of the lighting device can be simple.

Further, according to an embodiment of the present application, the light attribute adjusting unit controls whether each light emitting unit in each filament group is in an on-state and a duty ratio of the turn-on duration in the on-state within one light emitting period, so that the light emitting units having different light attributes from each other in the lighting device are turned on alternately within one light emitting period, so as to generate an additional light attribute that is different from the light attribute of any light emitting unit.

In this way, by controlling the duty ratio of the turn-on duration of a light emitting unit in the on-state within one light emitting period, at least two light emitting units having different light attributes from each other in the lighting device can be turned on alternately within one light emitting period, so that the light attribute of the light emitted from the lighting device can be different from the light attribute of any light emitting unit.

Further, according to an embodiment of the present application, the light attribute adjusting unit includes a control unit, at least one first switch pair and at least one second switch pair, the first end of each filament group is connected to one of the at least one first switch pair, and the second end of each filament group is connected to one of the at least one second switch pair.

In this way, by using the light attribute adjusting unit composed of the control unit, the first switch pairs and the second switch pairs, it is possible to adjust the on/off state, as well as the duty ratio of the turn-on duration in the on-state within one light emitting period, for each light emitting unit in each filament group.

Further, according to an embodiment of the present application, each of the first switch pair and the second switch pair includes a first switch and a second switch that are electrically connected; the first switch is connected to a positive end of a voltage, the second switch is connected to a negative end of the voltage; the first switch and the second switch of each switch pair are commonly connected to the first end or the second end of the filament group that is connected to the switch pair; the first light emitting unit of each filament group is turned on when the first switch of the first switch pair and the second switch of the second switch pair are turned on, and the second light emitting unit of each filament group is turned on when the second switch of the first switch pair and the first switch of the second switch pair are turned on.

In this way, a switch pair composed of two switches is used for controlling the voltage level of one end of the corresponding filament group, therefore it is possible to control the on/off state, as well as the duty ratio of the turn-on duration in the on-state within one light emitting period, of each light emitting unit in the filament group.

Further, according to an embodiment of the present application, each switch pair further includes switch drivers corresponding to the first switch and the second switch respectively, and the control unit sends switch control signals to the switch drivers, so that the switch drivers control the turn-on and the duty ratio of the turn-on duration within one light emitting period of the first switch or the second switch.

In this way, the control unit sends the switch control signals to the switch drivers, so that the switch driver can control the turn-on, as well as the duty ratio of the turn-on duration within one light emitting period, of the corresponding switch, and thus it is possible to control the on/off state and the duty ratio of the turn-on duration in the on-state within one light emitting period of each light emitting unit in the corresponding filament group.

In this way, a user can remotely send, to the control unit, the input signal that indicates a light attribute, so that the user can conveniently adjusting the light attribute of the light emitted from the lighting device.

According to another aspect of the present application, a lighting device is further provided, including: at least one filament group, wherein each filament group includes at least one filament, each filament includes at least one first light emitting unit and at least one second light emitting unit, which are connected in anti-parallel, and the first light emitting unit and the second light emitting unit have different colors from each other; and a color adjusting unit, which is connected to both ends of each filament group, so that the color of light emitted from the lighting device is switchable between the colors of different light emitting units.

In this way, the color of the light emitted from the lighting device containing the filaments can be adjusted using the color adjusting unit, such that the color of the light emitted from the lighting device is switchable between the colors of different light emitting units.

Further, according to an embodiment of the present application, the color adjusting unit includes a switch unit, and the switch unit receives an external input signal to switch between different light emitting units for turn-on, so as to switch the color of the light emitted from the lighting device, wherein the switch unit includes a mechanical switch or an electronic switch.

In this way, by disposing the mechanical switch or the electronic switch in the color adjusting unit, it is possible to switch the color of the light emitted from the lighting device.

Further, according to an embodiment of the present application, each filament group has a first end and a second end, each filament group includes several identical filaments, and the several identical filaments are connected in series or in parallel; the at least one filament group includes a first filament group and a second filament group, any light emitting unit in the first filament group and any light emitting unit in the second filament group have different light attributes from each other; and at any timing, only the first light emitting unit or the second light emitting unit in one filament group in the lighting device is turned on; and the second end of the first filament group and the first end of the second filament group are connected to each other and are commonly connected to the color adjusting unit.

Further, according to an embodiment of the present application, each filament group has a first end and a second end, each filament group includes several identical filaments, and the several identical filaments are connected in series or in parallel; the at least one filament group includes a first filament group and a second filament group, any light emitting unit in the first filament group and any light emitting unit in the second filament group have different light attributes from each other; and at any timing, only the first light emitting unit or the second light emitting unit in one filament group in the lighting device is turned on; and the second end of the first filament group and the first end of the second filament group are connected to each other and are commonly connected to the color adjusting unit.

In this way, when the lighting device includes two or more filament groups, the light emitting units from different filament groups have different light attributes from each other. Moreover, the filament groups of the lighting device can be connected to the color adjusting unit by a smaller number of guide wires (the number of guide wires is equal to the number of filament groups plus 1), so that the assembly process of the lighting device can be simple.

Further, according to an embodiment of the present application, the color adjusting unit includes a double-pole four-throw mechanical switch, wherein the double-pole four-throw mechanical switch includes a first pole, a second pole, a first fixed end, a second fixed end, and a first movable end to an eighth movable end; the first pole is connected to a positive end of a voltage via the first fixed end, and is switchable between the first movable end to the fourth movable end, so as to be connected to one end of the first light emitting unit or the second light emitting unit in one filament group of the lighting device via one of the first movable end to the fourth movable end; and the second pole is connected to a negative end of the voltage via the second fixed end, and is switchable between the fifth movable end to the eighth movable end, so as to be connected to the other end of the first light emitting unit or the second light emitting unit in the one filament group of the lighting device via one of the fifth movable end to the eighth movable end.

In this way, for example, the first pole can be connected to an anode end of the first or second light emitting unit in one filament group via one of the first movable end to the fourth movable end, and the second pole can be connected to a cathode end of the first or second light emitting unit in the filament group via one of the fifth movable end to the eighth movable end. When the lighting device includes two filament groups and thus includes four light emitting units, the double-pole four-throw mechanical switch can be used as a color adjusting unit to switch the color of the light emitted from the lighting device.

According to yet another aspect of the present application, a lighting device is further provided, including: a first filament group and a second filament group, wherein each filament group includes at least one filament, each filament includes at least one first light emitting unit and at least one second light emitting unit, which are connected in anti-parallel, the first light emitting unit and the second light emitting unit have different color temperatures from each other, any light emitting unit in the first filament group and any light emitting unit in the second filament group have different color temperatures from each other, and at any timing, only the first light emitting unit or the second light emitting unit in one filament group in the lighting device is turned on; and a double-pole four-throw mechanical switch, which is connected to both ends of each filament group, so that the color temperature of light emitted from the lighting device is switchable between the color temperatures of different light emitting units, wherein the double-pole four-throw mechanical switch includes a first pole, a second pole, a first fixed end, a second fixed end, and a first movable end to an eighth movable end, the first pole is connected to a positive end of a voltage via the first fixed end, and is switchable between the first movable end to the fourth movable end, so as to be connected to one end of the first light emitting unit or the second light emitting unit in one filament group of the lighting device via one of the first movable end to the fourth movable end, and the second pole is connected to a negative end of the voltage via the second fixed end, and is switchable between the fifth movable end to the eighth movable end, so as to be connected to the other end of the first light emitting unit or the second light emitting unit in the one filament group of the lighting device via one of the fifth movable end to the eighth movable end.

In this way, when the lighting device includes two filament groups and thus includes four light emitting units, the double-pole four-throw mechanical switch can be used as a color temperature adjusting unit to switch the color temperature of the light emitted from the lighting device, so as to adjust the color temperature of the lighting device.

In the embodiments of the present application, a lighting device is provided, including: at least one filament group, wherein each filament group includes at least one filament, each filament includes at least one first light emitting unit and at least one second light emitting unit, which are connected in anti-parallel, and the first light emitting unit and the second light emitting unit have different light attributes from each other; and the light attribute adjusting unit, connected to both ends of each filament group to adjust the light attribute of the light emitted from the lighting device, wherein the light attribute of the emitted light can be different from the light attribute of any light emitting unit. Therefore, the technical problem in the prior art that it is difficult to realize a simple process and a low manufacturing cost for the lighting device while the light attribute of the lighting device is made adjustable is at least solved. Accordingly, an effect of providing an improved lighting device with low price, simple process, and adjustable color and color temperature is realized.

BRIEF DESCRIPTION OF THE DRAWINGS

The drawings constituting a part of the present application are used for providing a further understanding of the present application, and exemplary embodiments of the present application and descriptions thereof are used for explaining the present application, but do not constitute improper limitations of the present application. In the drawings.

Figure 1:
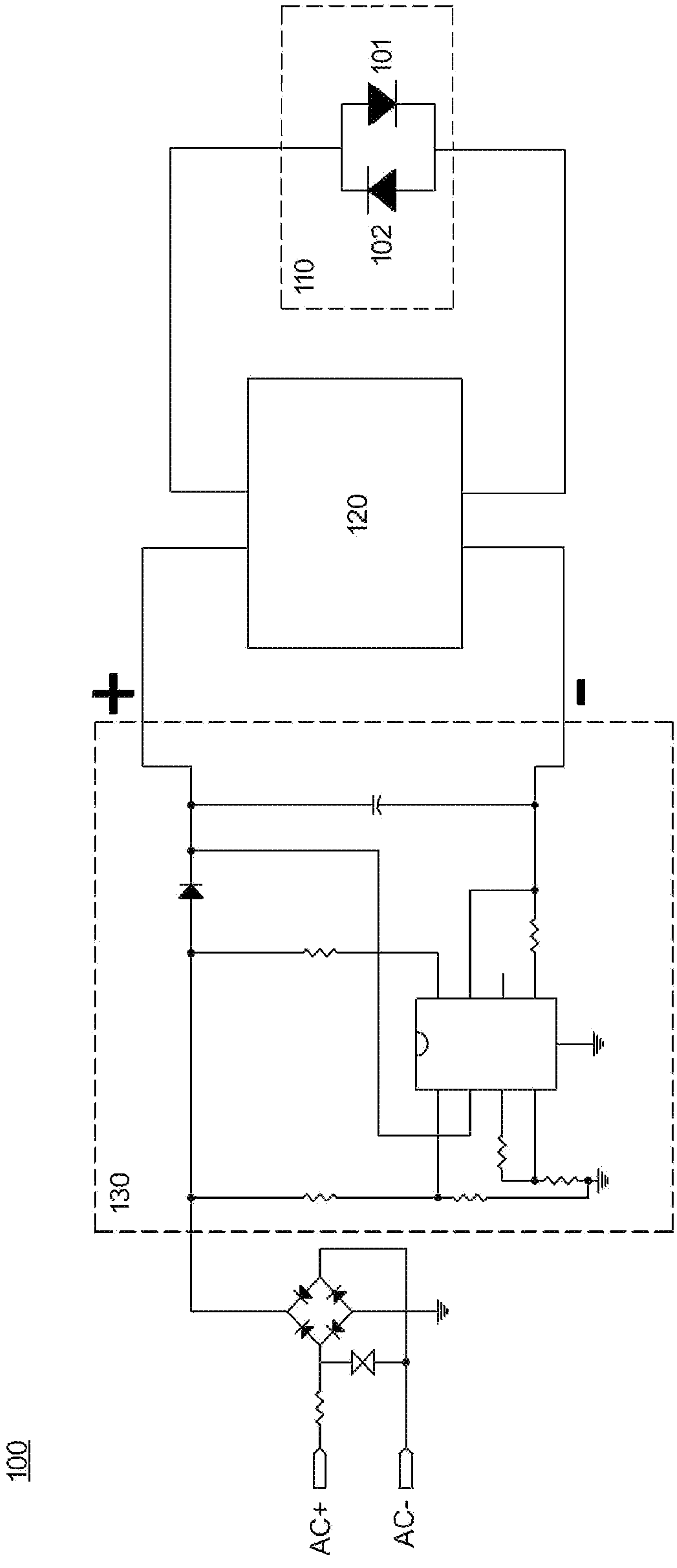
FIG. 1 is a schematic diagram of a lighting device according to an embodiment of the present application.

The above drawings include the following reference signs:

100, 300, 400, 500: Lighting device
110 (110$_1$ . . . 110$_n$): Filament group
101, 301, 401, 501: First light emitting unit
102, 302, 402, 502: Second light emitting unit
403, 503: Third light emitting unit
404, 504: Fourth light emitting unit
103: First extraction electrode
104: Second extraction electrode
105: Third extraction electrode
111, 311, 411, 511: First guide wire
112, 312, 412, 512: Second guide wire
113, 413, 513: Third guide wire
120, 320, 420, 520: Light attribute adjusting unit
130: Driving unit
310, 410, 510: First filament group
430, 530: Second filament group
330, 431: Control unit
340, 440: First switch pair
341: First switch
TD1: First switch driver
342: Second switch
TD2: Second switch driver
350, 450: Second switch pair
351, 451: Third switch
TD3: Third switch driver
352, 452: Fourth switch
TD4: Fourth switch driver
460: Third switch pair
461: Fifth switch
TD5: Fifth switch driver
462: Sixth switch
TD6: Sixth switch driver
T: Light emitting period
F1: First fixed end
F2: Second fixed end
M1 to M8: First movable end to eighth movable end

DETAILED DESCRIPTION OF THE EMBODIMENTS

It should be illustrated that, if there is no conflict, embodiments in the present application and features in the embodiments can be combined with each other. Hereinafter, the present application will be described in detail with reference to the drawings and in conjunction with the embodiments.

It should be pointed out that, unless otherwise specified, all technical and scientific terms used in the present application have the same meanings as commonly understood by those of ordinary skill in the technical field to which the present application belongs.

In present application, unless otherwise stated, orientation words used such as "up, down, top and bottom" are usually directed to directions shown in the drawings, or are directed to vertical, perpendicular or gravitational directions of components themselves; and similarly, for the convenience of understanding and description, "inside and outside" refer to inside and outside relative to the contours of the components themselves, but the above-mentioned orientation words are not used for limiting the present application.

The purpose of the present application is to provide an improved lighting device (such as a filament lamp) which has the advantages of simple process and low manufacturing cost while the light attribute thereof is adjustable.

In the present application, the light attribute include color and color temperature. The lighting device refers to a lighting device that includes a filament and a light emitting unit (e.g., an LED) is contained in the filament, such as a filament lamp. The filament lamp is, for example, a bulb, preferably a smart bulb with controllable light attributes.

In order to achieve the above purpose, the present application provides a lighting device. FIG. 1 is a schematic diagram of a lighting device according to an embodiment of the present application. As shown in FIG. 1, the lighting device 100 includes: at least one filament group, wherein each filament group 110 includes at least one filament, each filament includes at least one first light emitting unit 101 and at least one second light emitting unit 102, which are connected in anti-parallel, and the first light emitting unit 101 and the second light emitting unit 102 have different light attributes from each other; and a light attribute adjusting unit 120, which is connected to both ends of each filament group 110 to adjust the light attribute of light emitted from the lighting device 100.

In the present application, the light attribute of the light emitted from the lighting device 100 is the same as or different from the light attribute of any light emitting unit in the lighting device 100. That is, adjusting the light attribute of the light emitted from the lighting device 100 includes: switching the light attribute of the light emitted from the lighting device 100 between the light attributes of different light emitting units; or mixing the light attributes of different light emitting units, so that the light attribute of the light emitted from the lighting device 100 is different from the light attribute of any light emitting unit.

Specifically, the light attribute adjusting unit 120 can switch the light attribute of the light emitted from the lighting device 100 between the light attributes of different light emitting units, by only controlling the on/off state of the first light emitting unit 101 and the second light emitting unit 102 in each filament group. The light attribute adjusting unit can adjust the light attribute of the light emitted from the lighting device 100 by controlling the on/off state and a turn-on duration/duty ratio in the on-state of the first light emitting unit 101 and the second light emitting unit 102 in each filament group, so that the light attribute of the light emitted from the lighting device 100 is different from the light attribute of any light emitting unit in the lighting device 100.

In the present application, each filament group 110 has a first end and a second end, and the light attribute adjusting unit 120 is connected to the first end and the second end of each filament group 110. Further, in the present application, each filament group 110 can include several (i.e., two or more) identical filaments, and the several identical filaments are connected in series or in parallel to form a filament group.

In the present application, the lighting device 100 can include a plurality of filament groups. When the lighting device 100 includes a plurality of filament groups, any light emitting unit in one filament group among the plurality of filament groups and any light emitting unit in another filament group among the plurality of filament groups have different light attributes from each other; and at any timing, only the first light emitting unit or the second light emitting unit in one filament group in the lighting device 100 is turned on. Alternatively, A first light emitting unit in a certain filament group in the lighting device 100 is turned on means that all the first light emitting units in the filament group are turned on. Similarly, a second light emitting unit in a certain filament group in the lighting device 100 is turned on means that all second light emitting units in the filament group are turned on.

In the present application, the light attribute adjusting unit 120 includes a switch unit to realize the above functions of the light attribute adjusting unit. Specifically, when the switch unit is a mechanical switch unit, the light attribute adjusting unit 120 can switch the light attribute of the light emitted from the lighting device 100 between the light attributes of different light emitting units. When the switch unit is an electronic switch unit, the light attribute adjusting unit 120 can not only switch the light attribute of the light emitted from the lighting device 100 between the light attributes of different light emitting units, but can also make the light attribute of the light emitted from the lighting device 100 be different from the light attribute of any light emitting unit.

As shown in FIG. 1, the lighting device 100 can further include a driving unit 130. An AC power supply voltage is rectified and then applied to the driving unit 130. An output voltage of the driving unit 130 is applied to the light attribute adjusting unit 120, and then applied to the first light emitting units or the second light emitting units in a filament group via the light attribute adjusting unit 120. The driving unit 130 can be a constant-current driver or a constant-voltage driver, and can also be a constant-current driver supporting triac dimming.

It should be noted that, although FIG. 1 shows that the lighting device 100 includes only one filament group 110, the lighting device 100 can also include a plurality of filament groups to have more light emitting units, thereby being adjusted to emit light with various different light attributes.

Figure 2:
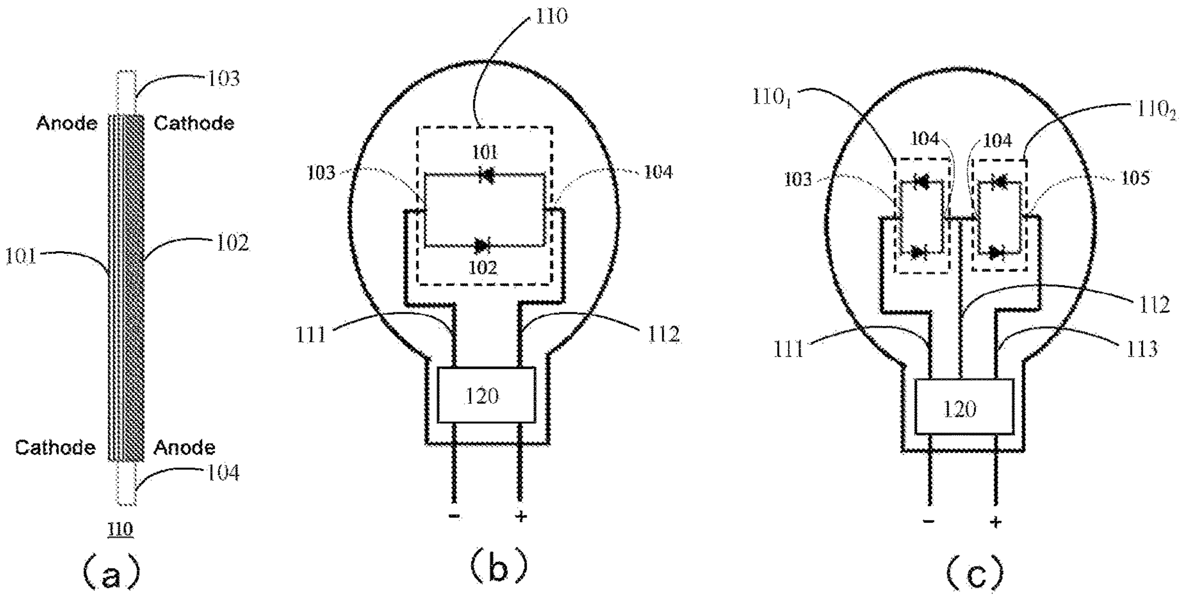
FIG. 2 shows an exemplary composition and connection structure of a filament group of a lighting device according to an embodiment of the present application.

FIG. 2 shows an exemplary composition and connection structure of a filament group of a lighting device according to an embodiment of the present application. FIG. 2(*a*) shows an exemplary composition structure of a single filament group 110. In particular, as an example, FIG. 2(*a*) shows a composition structure of the filament group 110 (or a single filament) in the case where the filament group 110 includes one filament, and the filament includes one first light emitting unit 101 and one second light emitting unit 102. It is conceivable that the filament can also include a plurality of first light emitting units 101 and a plurality of second light emitting units 102, wherein the plurality of first light emitting units 101 are connected in series, and the plurality of second light emitting units 102 are also connected in series. In addition, the filament group 110 can also include a plurality of identical filaments, and the plurality of identical filaments are connected in series or in parallel to form the filament group 110. As shown in FIG. 2(*a*), the filament group 110 includes a substrate, and a first light emitting unit 101 and a second light emitting unit 102 that are arranged on the substrate. A first extraction electrode 103 and a second extraction electrode 104 are respectively arranged on both ends of the filament group (or the substrate). The first end (e.g., an anode end) of the first light emitting unit 101 and the second end (e.g., a cathode end) of the second light emitting unit 102 are connected to the first extraction electrode 103, and the second end (e.g., the cathode end) of the first light emitting unit 101 and the first end (e.g., the anode end) of the second light emitting unit 102 are connected to the second extraction electrode 104.

FIG. 2(*b*) shows a connection structure between a single filament group 110 shown in FIG. 2(*a*) and the light attribute adjusting unit 120. As shown in FIG. 2(*b*), the first extraction electrode 103 of the filament group 110 is connected to the light attribute adjusting unit 120 via a first guide wire 111, and the second extraction electrode 104 is connected to the light attribute adjusting unit 120 via a second guide wire 112. The filament group 110 and the light attribute adjusting unit 120 can be arranged inside a bulb shell of the lighting device 100.

FIG. 2(*c*) shows a connection structure between two filament groups and the light attribute adjusting unit 120. As shown in FIG. 2(*c*), when the lighting device 100 includes a first filament group $\mathbf{110}_1$ and a second filament group $\mathbf{110}_2$, the second end of the first filament group $\mathbf{110}_1$ and the first end of the second filament group $\mathbf{110}_2$ are connected to each other, and are commonly connected to the light attribute adjusting unit 120. Specifically, the first end of the first filament group $\mathbf{110}_1$ is provided with a first extraction electrode 103, the second end of the first filament group $\mathbf{110}_1$ and the first end of the second filament group $\mathbf{110}_2$ are provided with a common second extraction electrode 104, and the second end of the second filament group $\mathbf{110}_2$ is provided with a third extraction electrode 105. The first extraction electrode 103 is connected to the light attribute adjusting unit 120 via a first guide wire 111, the second extraction electrode 104 is connected to the light attribute adjusting unit 120 via a second guide wire 112, and the third extraction electrode 105 is connected to the light attribute adjusting unit 120 via a third guide wire 113.

FIG. 2(*c*) shows a case as an example where each of the first filament group $\mathbf{110}_1$ and the second filament group $\mathbf{110}_2$ includes only one filament, and the single filament includes only one first light emitting unit and one second light emitting unit. However, it is also conceivable that the first filament group $\mathbf{110}_1$ and/or the second filament group $\mathbf{110}_2$ includes a plurality of identical filaments, and each filament includes a plurality of first light emitting units and a plurality of second light emitting units.

Similarly, when the lighting device 100 includes a plurality of filament groups $\mathbf{110}_1$ to $\mathbf{110}_n$ (n is an integer greater than 1), these filament groups are connected in sequence, and the second end of the current filament group and the first end of the next filament group are connected to the light attribute adjusting unit 120 via a common guide wire.

In the present application, each light emitting unit can be a light emitting diode (LED), or can be a combination of an LED and a phosphor to emit light of various color temperatures or various colors.

In the present application, a filament in the filament group 110 can be an ordinary non-flexible filament. The lighting device 100 according to the present application can have the same shape and structure as a conventional bulb, so as to be suitable for replacing the conventional bulb.

Next, various exemplary embodiments of the lighting device 100 according to the embodiments of the present application will be described in detail with reference to FIG. 3 to FIG. 5.

Figure 3:
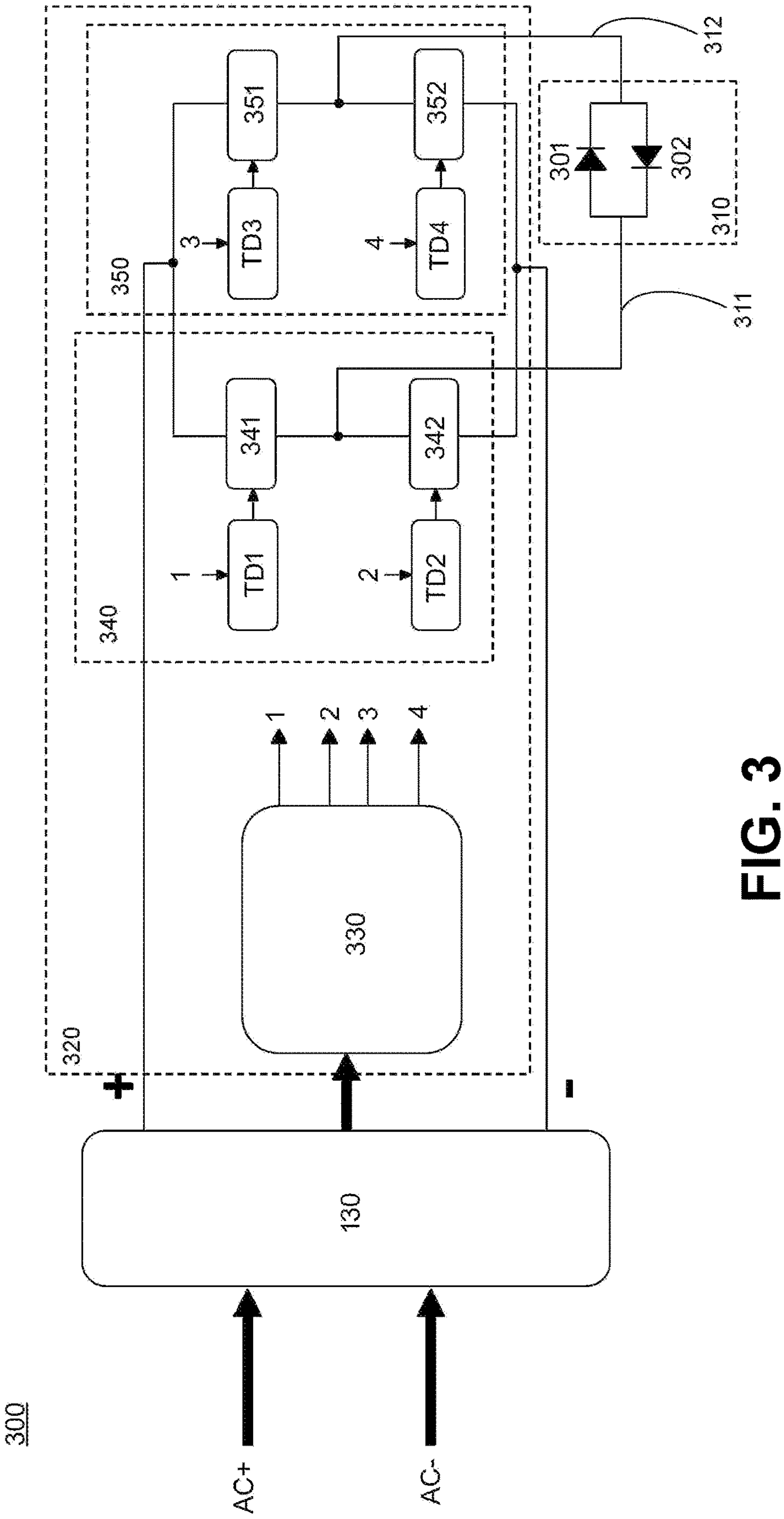
FIG. 3 is a schematic diagram of a lighting device according to an exemplary embodiment of the present application.

FIG. 3 is a schematic diagram of a lighting device according to an exemplary embodiment of the present application. As shown in FIG. 3, the lighting device 300 is a specific example of the lighting device 100 shown in FIG. 1. The lighting device 300 includes a first filament group 310 and a light attribute adjusting unit 320. The lighting device 300 can further include the driving unit 130 shown in FIG. 1. The first filament group 310 can be the same as the filament group 110 shown in FIG. 2. The first filament group 310 includes at least one filament, and each filament includes at least one first light emitting unit 301 and at least one second light emitting unit 302, which are connected in anti-parallel. The light attribute adjusting unit 320 includes an electronic switch, and controls, by using the electronic switch, whether each light emitting unit in each filament group is in an on-state and a duty ratio of a turn-on duration in the on-state within one light emitting period T, so that the first light emitting unit 301 and the second light emitting unit 302 in the lighting device 300 can be turned on alternately within one light emitting period T, so as to generate an additional light attribute that is different from the light attribute of any light emitting unit in the lighting device 300. For example, the lighting device 300 emits an additional color that is different from the color of any light emitting unit, and/or the lighting device 300 emits an additional color temperature that is different from the color temperature of any light emitting unit.

The light attribute adjusting unit 320 includes a control unit 330, a first switch pair 340 and a second switch pair 350. The first switch pair 340 is connected to the first end of the first filament group 310 via a first guide wire 311, and the second switch pair 350 is connected to the second end of the first filament group 310 via a second guide wire 312.

The control unit 330 includes any one or more of a micro-control unit, a Bluetooth control unit, a WIFI control unit and an infrared control unit. The control unit 330 is used for receiving an external input signal indicating a light attribute, and controlling the turn-on, as well as the duty ratio of the turn-on duration within one light emitting period, of the corresponding switch in each switch pair according to the input signal.

The first switch pair 340 includes a first switch 341 and a second switch 342 that are electrically connected. The second switch pair 350 includes a third switch 351 and a fourth switch 352 that are electrically connected. The first switch 341 and the third switch 351 are connected to a positive end (which is the positive end of the voltage output by the driving unit 130) of a voltage, and the second switch 342 and the fourth switch 352 are connected to a negative end (which is the negative end of the voltage output by the driving unit 130) of the voltage. In addition, a connecting wire between the first switch 341 and the second switch 342 is connected to the first guide wire 311, and the connecting wire between the third switch 351 and the fourth switch 352 is connected to the second guide wire 312.

In this way, the first guide wire 311 is power energized when the first switch 341 or the second switch 342 is turned on, and the second guide wire 312 is power energized when the third switch 351 or the fourth switch 352 is turned on. Moreover, the first guide wire 311 is at a high level (e.g., the output voltage level of the driving unit 130) when the first switch 341 is turned on, and the first guide wire 311 is at a low level (e.g., grounded) when the second switch 342 is turned on. Similarly, the second guide wire 312 is at a high level when the third switch 351 is turned on, and the second guide wire 312 is at a low level when the fourth switch 352 is turned on.

In FIG. 3, the first light emitting unit 301 is turned on to emit light when the first guide wire 311 is at a high level and the second guide wire 312 is at a low level, and the second light emitting unit 302 is turned on to emit light when the first guide wire 311 is at a low level and the second guide wire 312 is at a high level. That is, the first light emitting unit 301 is turned on when the first switch 341 and the fourth switch 352 are turned on, and the second light emitting unit 302 is turned on when the second switch 342 and the third switch 351 are turned on. In this way, at any timing, at most one kind of light emitting units in the lighting device 300 can be turned on. In the lighting device 300, the relationship between the on/off of the switches and the on/off of the light emitting units is shown in Table 1 below.

TABLE 1

The relationship between the on/off of the switches and the on/off of the light emitting units in the lighting device 300.

| | The first light emitting unit 301 is turned on | The second light emitting unit 302 is turned on | Neither the first light emitting unit nor the second light emitting unit is turned on |
|---|---|---|---|
| First switch 341 | On | Off | Off |
| Second switch 342 | Off | On | Off |
| Third switch 351 | Off | On | Off |
| Fourth switch 352 | On | Off | Off |

In the lighting device 300, the first switch 341 to the fourth switch 352 are all electronic switches, such as switch transistors.

Further, each of the first switch pair 340 and the second switch pair 350 can further include switch drivers corresponding to each of the switches. Specifically, the first switch pair 340 further includes a first switch driver TD1 corresponding to the first switch 341 and a second switch driver TD2 corresponding to the second switch 342. The second switch pair 350 further includes a third switch driver TD3 corresponding to the third switch 351 and a fourth switch driver TD4 corresponding to the fourth switch 352. The control unit 330 receives an external input signal indicating a light attribute, converts the input signal into switch control signals and sends the same to the switch drivers, so as to control the turn-on, as well as the duty ratio of the turn-on duration within one light emitting period, of the corresponding switches.

As shown in FIG. 3, in the case where there are the first switch driver TD1 to the fourth switch driver TD4, the control unit 330 can have four outputs (as indicated by marks 1 to 4 in FIG. 3), and each output is connected to a corresponding switch driver so as to transmit the switch control signal thereto.

The control unit 330 sends, to the switch drivers, switch control signals whose period is the light emitting period T (for example, T<200 μs), so that the light emitting units emit light with the period T. When only one kind of light emitting units are turned on within one light emitting period T, the light attribute of the light emitted from the lighting device 300 is the light attribute of the light emitting units which are turned on. When the light emitting units having different light attributes from each other are alternately turned on within one light emitting period T, the light attribute of the light emitted from the lighting device 300 is an additional light attribute generated by mixing the light attributes of those turned-on light emitting units.

For example, in the present application, when the light attribute is color temperature (CCT), it is assumed that the light attribute (CCT1) of the first light emitting unit 301 is 2700K, the light attribute (CCT2) of the second light emitting unit 302 is 5000K, and the frequency of the switch control signals is 1K, that is, the light emitting period is 100 μs.

Assuming that the light attribute indicated by the input signal received by the control unit 330 is a color temperature of 3500K, then the control unit 330 can send the switch control signals to the first switch driver TD1 and the fourth switch driver TD4, so as to drive the first switch 341 and the fourth switch 352 to be turned on for the first 50 μs within each light emitting period T (that is, the duty ratio of the turn-on duration within one light emitting period is 50%), and the control unit sends other switch control signals to the second switch driver TD2 and the third switch driver TD3, so as to drive the second switch 342 and the third switch 351 to be turned on for the last 50 μs within each light emitting period T (that is, the duty ratio of the turn-on duration within one light emitting period is 50%). Thus, the first light emitting unit 301 emits light in the first half of each light emitting period T, and the second light emitting unit 302 emits light in the second half of each light emitting period T. Therefore, the lighting device 300 as a whole emits light with a color temperature of 3500K.

Assuming that the light attribute indicated by the input signal received by the control unit 330 is a color temperature of 2700K, then the control unit 330 can send the switch control signals to the second switch driver TD2 and the third switch driver TD3 so as to turn off the second switch 342 and the third switch 351, so that the second light emitting unit 302 is not turned on within the entire light emitting period T, and the control unit sends the switch control signals to the first switch driver TD1 and the fourth switch driver TD4, so as to drive the first switch 341 and the fourth switch 352 to be turned on continuously within each light emitting period T (that is, the duty ratio of the turn-on duration within one light emitting period is 100%). Thus, the first light emitting unit 301 is continuously turned on within each light emitting period T, and the lighting device 300 emits light with a color temperature of 2700K.

Similarly, when the light attribute is color, it is assumed that the color of the light emitted from the first light emitting unit 301 is red, and the color of the light emitted from the second light emitting unit 302 is blue. The frequency of the switch control signals is 2K, that is, the light emitting period is 50 μs.

Assuming that the light attribute indicated by the input signal received by the control unit 330 is pink, then the control unit 330 can send the switch control signals to the first switch driver TD1 and the fourth switch driver TD4, so as to drive the first switch 341 and the fourth switch 352 to be turned on for 45 μs within each light emitting period T (that is, the duty ratio of the turn-on duration within one light emitting period is 90%), and the control unit sends other switch control signals to the second switch driver TD2 and the third switch driver TD3, so as to drive the second switch 342 and the third switch 351 to be turned on for 5 μs within each light emitting period T (that is, the duty ratio of the turn-on duration within one light emitting period is 10%). Thus, within one light emitting period T, the first light emitting unit 301 emits light for 45 μs, and the second light emitting unit 302 emits light for 5 μs. Therefore, the lighting device 300 as a whole emits light with a color of pink.

It should be noted that in FIG. 3, the AC power supply voltage is rectified and then applied to the driving unit 130, and the driving unit 130 can include a constant-current or constant-voltage driver.

Figure 4:
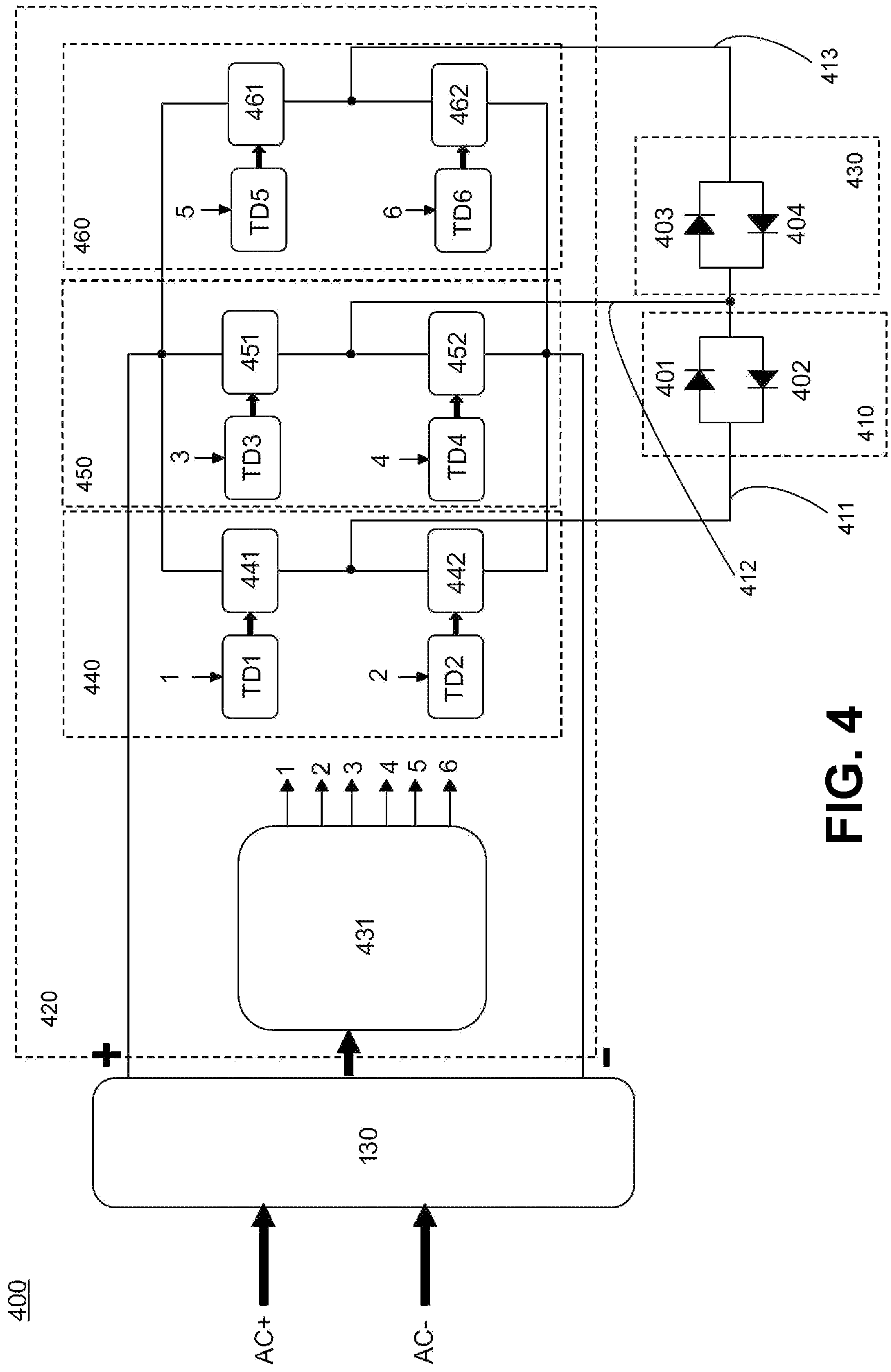
FIG. 4 is a schematic diagram of a lighting device according to another exemplary embodiment of the present application.

FIG. 4 is a schematic diagram of a lighting device according to another exemplary embodiment of the present application. As shown in FIG. 4, the lighting device 400 is another specific example of the lighting device 100 shown in FIG. 1. The lighting device 400 includes a first filament group 410, a second filament group 430, and a light attribute adjusting unit 420. The lighting device 400 can further include the driving unit 130 shown in FIG. 1. Both the first filament group 410 and the second filament group 430 can be the same as the filament group 110 shown in FIG. 2. Specifically, the first filament group 410 includes at least one filament, and each filament includes at least one first light emitting unit 401 and at least one second light emitting unit 402, which are connected in anti-parallel. The second filament group 430 includes at least one filament, and each filament includes at least one third light emitting unit 403 and at least one fourth light emitting unit 404, which are connected in anti-parallel. The first light emitting unit 401, the second light emitting unit 402, the third light emitting unit 403 and the fourth light emitting unit 404 have different light attributes from each other.

The light attribute adjusting unit 420 includes a control unit 431, a first switch pair 440, a second switch pair 450 and a third switch pair 460. The first switch pair 440 is connected to the first end of the first filament group 410 via a first guide wire 411, and the second switch pair 450 is connected to the second end of the first filament group 410 and the first end of the second filament group 430 via a second guide wire 412. The third switch pair 460 is connected to the second end of the second filament set 430 via a third guide wire 413.

The control unit 431 can be the same as the control unit 330 shown in FIG. 3, and can include any one or more of a micro-control unit, a Bluetooth control unit, a WIFI control unit and an infrared control unit, so as to receive an external input signal indicating a light attribute, and control, according to the input signal, the turn-on as well as a duty ratio of the turn-on duration within one light emitting period of the corresponding switch in each switch pair.

The first switch pair 440 includes a first switch 441 and a second switch 442 that are electrically connected. The second switch pair 450 includes a third switch 451 and a fourth switch 452 that are electrically connected. The third switch pair 460 includes a fifth switch 461 and a sixth switch 462 that are electrically connected. The first switch 441, the third switch 451 and the fifth switch 461 are connected to a positive end (which is the positive end of the voltage output by the driving unit 130) of a voltage, and the second switch 442, the fourth switch 452 and the sixth switch 462 are connected to a negative end (which is the negative end of the voltage output by the driving unit 130) of the voltage. In addition, a connecting wire between the first switch 441 and the second switch 442 is connected to the first guide wire 411, the connecting wire between the third switch 451 and the fourth switch 452 is connected to the second guide wire 412, and the connecting wire between the fifth switch 461 and the sixth switch 462 is connected to the third guide wire 413.

The first light emitting unit 401 is turned on when the first guide wire 411 is at a high level and the second guide wire 412 is at a low level, the second light emitting unit 402 is turned on when the first guide wire 411 is at a low level and the second guide wire 412 is at a high level, the third light emitting unit 403 is turned on when the second guide wire 412 is at a high level and the third guide wire 413 is at a low level, and the fourth light emitting unit 404 is turned on when the second guide wire 412 is at a low level and the third guide wire 413 is at a high level. Therefore, in the lighting device 400, the relationship between the on/off of the switches and the on/off of the light emitting units is shown in Table 2 below.

TABLE 2

The relationship between the on/off of the switches and the on/off of the light emitting units in the lighting device 400.

| | The first light emitting unit 401 is turned on | The second light emitting unit 402 is turned on | The third light emitting unit 403 is turned on | The fourth light emitting unit 404 is turned on | All light emitting units are not turned on |
|---|---|---|---|---|---|
| First switch 441 | On | Off | Off | Off | Off |
| Second switch 442 | Off | On | Off | Off | Off |
| Third switch 451 | Off | On | On | Off | Off |
| Fourth switch 452 | On | Off | Off | On | Off |
| Fifth switch 461 | Off | Off | Off | On | Off |
| Sixth switch 462 | Off | Off | On | Off | Off |

In the lighting device 400, the first switch 441 to the sixth switch 462 are all electronic switches, such as switch transistors.

Further, the first switch pair 440 further includes a first switch driver TD1 corresponding to the first switch 441 and a second switch driver TD2 corresponding to the second switch 442. The second switch pair 450 further includes a third switch driver TD3 corresponding to the third switch 451 and a fourth switch driver TD4 corresponding to the fourth switch 452. The third switch pair 460 further includes a fifth switch driver TD5 corresponding to the fifth switch 461 and a sixth switch driver TD6 corresponding to the sixth switch 462.

The control unit 431 receives an external input signal indicating a light attribute, converts the input signal into switch control signals and sends the same to the switch drivers, so as to control the turn-on, as well as the duty ratio of the turn-on duration within one light emitting period, of the corresponding switches.

As shown in FIG. 4, in the case where there are the first switch driver TD1 to the sixth switch driver TD6, the control unit 431 can have six outputs (as indicated by marks 1 to 6 in FIG. 4), and each output is connected to a corresponding switch driver so as to transmit the switch control signal thereto.

Similar to the situation shown in FIG. 3, the period of the switch control signals is the light emitting period T (for example, T<200 μs). When only one kind of light emitting units are turned on within one light emitting period T, the light attribute of the light emitted from the lighting device 400 is the light attribute of the light emitting units which are turned on. When at least two different kinds of light emitting units are alternately turned on within one light emitting period T, the light attribute of the light emitted from the lighting device 400 is an additional light attribute generated by mixing the light attributes of those turned-on light emitting units.

For example, when the light attribute is color, it is assumed that the color of the light emitted from the first light emitting unit 401 is red, the color of the light emitted from the second light emitting unit 402 is white, the color of the light emitted from the third light emitting unit 403 is green, and the color of the light emitted from the fourth light emitting unit 404 is blue. The frequency of the switch control signals is 2K, that is, the light emitting period is 50 μs.

For example, when the light attribute indicated by the input signal received by the control unit 431 is pink, the control unit 431 can convert the input signal into switch control signals for controlling the first switch driver TD1 to the sixth switch driver TD6, so that the first switch 441 and the fourth switch 452 are driven to be turned on for the first 45 μs within each light emitting period T (that is, the duty ratio of the turn-on duration within one light emitting period is 90%), the fourth switch 452 and the fifth switch 461 are driven to be turned on for the last 5 μs within each light emitting period T (that is, the duty ratio of the turn-on duration within one light emitting period is 10%), and the second switch 442, the third switch 451 and the sixth switch 462 are driven to be turned off within the entire light emitting period T. Therefore, within one light emitting period, the first light emitting unit 401 emits red light for the first 45 μs, and the fourth light emitting unit 404 emits blue light for the last 5 μs. Therefore, the lighting device 400 as a whole emits light with a color of pink.

When the light attribute is color temperature, similarly, the color temperature of the light emitted from the lighting device 400 can be adjusted by sending the switch control signals to the switch drivers to control the turn-on, as well as the duty ratio of the turn-on duration within one light emitting period T, of the corresponding switches.

It is conceivable that, when the lighting device 400 has more filament groups, for example, has N (N is an integer greater than 2) filament groups, the N filament groups are sequentially connected and are electrically connected to the light attribute adjusting unit 420 via N+1 guide wires. At this time, the light attribute adjusting unit 420 includes the control unit 431 and N+1 switch pairs, each switch pair includes a first switch and a second switch that are electrically connected, the first switch is connected to the positive end of a corresponding voltage, the second switch is connected to the negative end of the corresponding voltage, and the connecting wire between the first switch and the second switch is connected to a corresponding guide wire. Each switch pair further includes switch drivers corresponding to the first switch and the second switch respectively. Similar to the above manner, the control unit 431 receives the external input signal indicating a light attribute, and converts the input signal into the switch control signals for controlling the switch drivers, so as to control the turn-on, as well as the duty ratio of the turn-on duration within one light emitting period T, of the corresponding switches. Therefore, the light attribute of the light emitted from the light emitting device 400 can be adjusted.

It should be noted that in FIG. 4, the AC power supply voltage is rectified and then applied to the driving unit 130, and the driving unit 130 can include a constant-current or constant-voltage driver.

Figure 5:
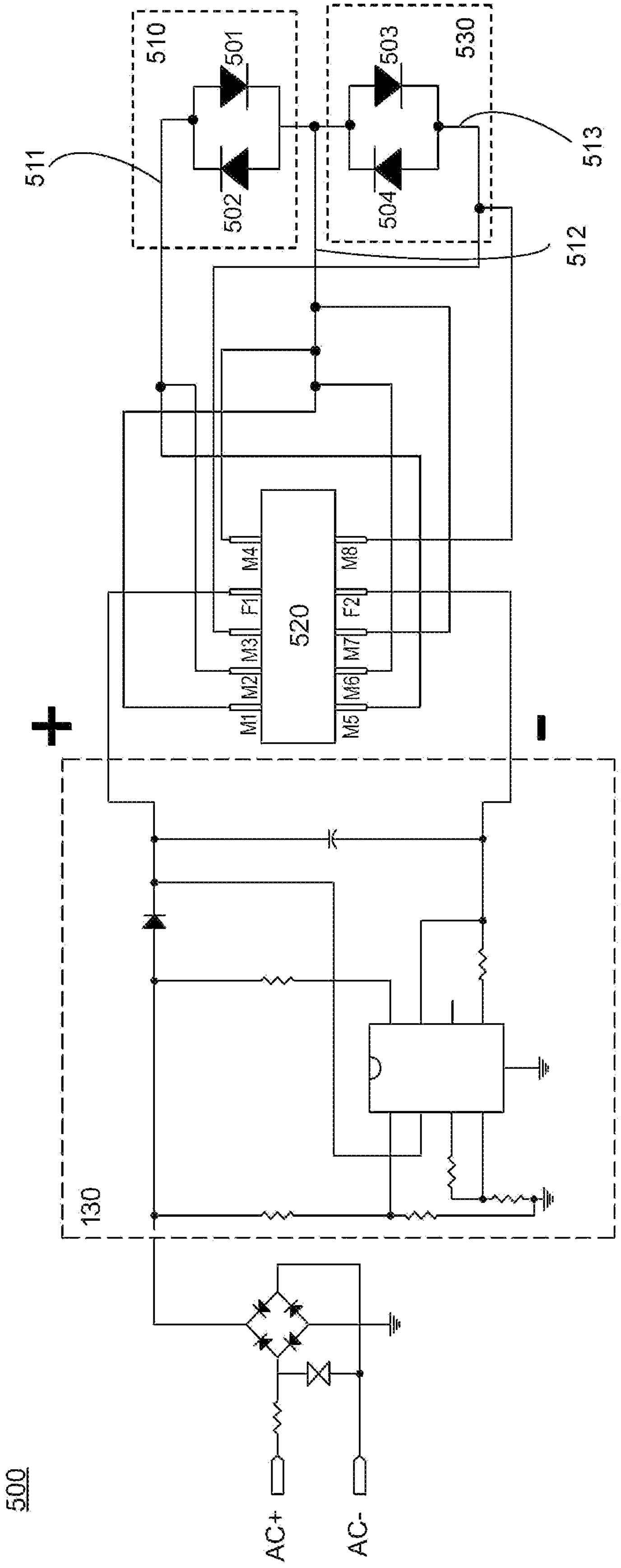
FIG. 5 is a schematic diagram of a lighting device according to yet another exemplary embodiment of the present application.

FIG. 5 is a schematic diagram of a lighting device according to yet another exemplary embodiment of the present application. As shown in FIG. 5, the lighting device 500 is yet another specific example of the lighting device 100 shown in FIG. 1. The lighting device 500 includes a first filament group 510, a second filament group 530 and a light attribute adjusting unit 520. The lighting device 500 can further include the driving unit 130 shown in FIG. 1. Both the first filament group 510 and the second filament group 530 can be the same as the filament group 110 shown in FIG. 2. Specifically, the first filament group 510 includes at least one filament, and each filament includes at least one first light emitting unit 501 and at least one second light emitting unit 502, which are connected in anti-parallel. The second filament group 530 includes at least one filament, and each filament includes at least one third light emitting unit 503 and at least one fourth light emitting unit 504, which are connected in anti-parallel. The first light emitting unit 501 to the fourth light emitting units 504 have different light attributes from each other, and the first light emitting unit 501 to the fourth light emitting units 504 can be the same as the first light emitting unit 401 to the fourth light emitting units 404 shown in FIG. 4.

The difference between the lighting device 500 shown in FIG. 5 and the lighting device 400 shown in FIG. 4 lies in that, the light attribute adjusting unit 520 includes a mechanical switch instead of electronic switches. Therefore, the light attribute of the light emitted from the lighting device 500 can only be switched between the light attributes of different light emitting units.

Specifically, in FIG. 5, the light attribute adjusting unit 520 is a double-pole four-throw mechanical switch, which is connected to the first end of the first filament group 510 via a first guide wire 511, is connected to the second end of the first filament group 510 and the first end of the second filament set 530 via a second guide wire 512, and is connected to the second end of the second filament set 530 via a third guide wire 513. By adjusting the light attribute adjusting unit 520, the light attribute of the light emitted from the lighting device 500 is switchable between the light attributes of different light emitting units.

As a double-pole four-throw mechanical switch, the light attribute adjusting unit 520 includes a first pole, a second pole, a first fixed end F1, a second fixed end F2, and a first movable end M1 to an eighth movable end M8. The first movable end M1 to the eighth movable end M8 are in one-to-one correspondence with a total of eight ends of the first light emitting unit 501 to the fourth light emitting units 504 (which are anode ends and cathode ends of the four light emitting units). The first pole is connected to a positive end (which is the positive end of the voltage output by the driving unit 130) of a voltage via the first fixed end F1, and is switchable between the first movable end M1 to the fourth movable end M4 for connection, so that a certain movable end is connected to the positive end of the voltage; and the second pole is connected to a negative end (which is the negative end of the voltage output by the driving unit 130) via the second fixed end F2, and is switchable between the fifth movable end M5 to the eighth movable end M8 for connection, so that a certain movable end is connected to the negative end of the voltage.

In FIG. 5, the first movable end M1, the fourth movable end M4, the sixth movable end M6 and the seventh movable end M7 are connected to the second end of the first filament group 510 and the first end of the second filament group 530 via the second guide wire 512, the second movable end M2 and the fifth movable end M5 are connected to the first end of the first filament group 510 via the first guide wire 511, and the third movable end M3 and the eighth movable end M8 are connected to the second end of the second filament group 530 via the third guide wire 513. Therefore, the relationship between the on/off of the movable ends and the on/off of the light emitting units is shown in Table 3 below.

TABLE 3

The relationship between the on/off of the movable ends and the on/off of the light emitting units in the lighting device 500.

| | The first light emitting unit 501 is turned on | The second light emitting unit 502 is turned on | The third light emitting unit 503 is turned on | The fourth light emitting unit 504 is turned on | All light emitting units are not turned on |
|---|---|---|---|---|---|
| First movable end M1 | Off | On | Off | Off | Off |
| Second movable end M2 | On | Off | Off | Off | Off |
| Third movable end M3 | Off | Off | Off | On | Off |
| Fourth movable end M4 | Off | Off | On | Off | Off |
| Fifth movable end M5 | Off | On | Off | Off | Off |
| Sixth movable end M6 | On | Off | Off | Off | Off |
| Seventh movable end M7 | Off | Off | Off | On | Off |
| Eighth movable end M8 | Off | Off | On | Off | Off |

In the present application, a gear position of the light attribute adjusting unit 520 can be exposed from a housing of the lighting device, so that a user can turn on the corresponding movable end by rotating or toggling the gear position, thereby turning on the corresponding light emitting unit to adjust the light attribute of the lighting device 500.

It should be noted that in FIG. 5, the driving unit 130 has a voltage conversion function, so as to convert the input AC power voltage into a DC voltage with a certain ripple and output the same to the light attribute adjusting unit 520. Moreover, the driving unit 130 includes a constant-current driver.

Correspondingly, the present application further provides a method for adjusting a light attribute of a lighting device. The lighting device includes at least one filament group, each filament group includes at least one filament, each filament includes at least one first light emitting unit and at least one second light emitting unit, which are connected in anti-parallel, and the first light emitting unit and the second light emitting unit have different light attributes from each other. The method includes: in response to an input signal from the outside, adjusting a light attribute of light emitted from the lighting device by controlling a light emitting state of each light emitting unit in the lighting device.

Further, the step of adjusting the light attribute of the light emitted from the lighting device by controlling the light emitting state of each light emitting unit in the lighting device includes: just controlling the on/off state of the first light emitting unit and the second light emitting unit in each filament group, so that the light attribute of the light emitted from the lighting device is switched between the light attributes of different light emitting units.

Further, the step of adjusting the light attribute of the light emitted from the lighting device by controlling the light emitting state of each light emitting unit in the lighting device includes: controlling the on/off state and a turn-on duration in the on-state of the first light emitting unit and the second light emitting unit in each filament group, so that the light attribute of the light emitted from the lighting device is different from the light attribute of any light emitting unit.

Further, the step of controlling the on/off state and the turn-on duration in the on-state of the first light emitting unit and the second light emitting unit in each filament group, so that the light attribute of the light emitted from the lighting device is different from the light attribute of any light emitting unit includes: controlling whether the first light emitting unit and the second light emitting in each filament group are in an on-state and a duty ratio of the turn-on duration in the on-state within one light emitting period, so that the light emitting units having different light attributes from each other in the lighting device are turned on alternately within one light emitting period, so as to generate an additional light attribute that is different from the light attribute of any light emitting unit.

Further, each filament group has a first end and a second end, each filament group includes several identical filaments, and the several identical filaments are connected in series or in parallel. The at least one filament group includes a first filament group, the first end of the first filament group is connected to a first switch pair, and the second end of the first filament group is connected to a second switch pair; each switch pair includes a first switch and a second switch that are electrically connected, the first switch is connected to a positive end of a voltage, the second switch is connected to a negative end of the voltage, and the first switch and the second switch are commonly connected to the first end or the second end of the filament group that is connected to the switch pair; and the step of adjusting the light attribute of the light emitted from the lighting device by controlling the light emitting state of each light emitting unit in the lighting device includes: in response to the input signal from the outside indicating a light attribute of the first light emitting unit of the first filament group, controlling to turn on the first switch of the first switch pair and the second switch of the second switch pair, so that the first light emitting unit of the first filament group is turned on to emit light, or in response to the input signal from the outside indicating a light attribute of the second light emitting unit of the first filament group, controlling to turn on the second switch of the first switch pair and the first switch of the second switch pair, so that the second light emitting unit of the first filament group is turned on to emit light.

The above method for adjusting the light attribute of the lighting device can be executed by the light attribute adjusting unit of the lighting device described with reference to FIG. 1 to FIG. 5, and thus will not be repeated herein.

It should be noted that, terms used herein are for the purpose of describing specific embodiments, and are not intended to limit the exemplary embodiments according to the present application. As used herein, unless the context clearly dictates otherwise, a singular form is intended to include a plural form as well. In addition, it should also be understood that, when the terms "comprising" and/or "including" are used in this specification, they indicate that the presence of features, steps, works, devices, components and/or combinations thereof.

It should be illustrated that, the terms "first" and "second" and the like in the specification, claims and the above-mentioned drawings of the present application are used for distinguishing similar objects, and are not necessarily used for describing a specific sequence or precedence order. It should be understood that, the data used in this way can be interchanged under appropriate circumstances, so that the embodiments of the present application described herein can be implemented in a sequence other than those illustrated or described herein.

The foregoing descriptions are only preferred embodiments of the present application, and are not intended to limit the present application, and for those skilled in the art, the present application can have various modifications and changes. Any modifications, equivalent replacements, improvements and the like, made within the spirit and principle of the present application, shall all be included in the protection scope of the present application.

We claim:

1. A lighting device, comprising:

at least one filament group having a first end and a second end, wherein each filament group comprises at least one filament, each filament comprises at least one first light emitting unit and at least one second light emitting unit, which are connected in anti-parallel, and the first light emitting unit and the second light emitting unit have different light attributes from each other; and a light attribute adjusting unit, which is connected to both ends of each filament group to adjust a light attribute of light emitted from the lighting device;

wherein the light attribute adjusting unit comprises a control unit, at least one first switch pair and at least one second switch pair, the first end of each filament group being connected to one of the at least one first switch pair, and the second end of each filament group being connected to one of the at least one second switch pair; and wherein the light attribute of the emitted light is different from the light attribute of any light emitting unit.

2. The lighting device according to claim 1, wherein the light attribute adjusting unit adjusts the light attribute of the light emitted from the lighting device by controlling the on/off state and a turn-on duration in the on-state of the first light emitting unit and the second light emitting unit in each filament group.

3. The lighting device according to claim 1, wherein each filament group comprises several identical filaments, and the several identical filaments are connected in series or in parallel.

4. The lighting device according to claim 1, wherein the at least one filament group comprises a first filament group and a second filament group, any light emitting unit in the first filament group and any light emitting unit in the second filament group have different light attributes from each other, and at any timing, only the first light emitting unit or the second light emitting unit in one filament group in the lighting device is turned on, and the second end of the first filament group and the first end of the second filament group are connected to each other and are commonly connected to the light attribute adjusting unit.

5. The lighting device according to claim 1, wherein the control unit of the light attribute adjusting unit controls whether each light emitting unit in each filament group is in an on-state and a duty ratio of the turn-on duration in the on-state within one light emitting period, so that the light emitting units having different light attributes from each other in the lighting device are turned on alternately within one light emitting period, so as to generate an additional light attribute that is different from the light attribute of any light emitting unit.

6. The lighting device according to claim 1, wherein each of the first switch pair and the second switch pair comprises a first switch and a second switch that are electrically connected, the first switch is connected to a positive end of a voltage, the second switch is connected to a negative end of the voltage, the first switch and the second switch of each switch pair are commonly connected to the first end or the second end of the filament group that is connected to the switch pair, and the first light emitting unit of each filament group is turned on when the first switch of the first switch pair and the second switch of the second switch pair are turned on, and the second light emitting unit of each filament group is turned on when the second switch of the first switch pair and the first switch of the second switch pair are turned on.

7. The lighting device according to claim 6, wherein each switch pair further comprises switch drivers corresponding to the first switch and the second switch respectively, and the control unit sends switch control signals to the switch drivers, so that the switch drivers control the turn-on and the duty ratio of the turn-on duration within one light emitting period of the first switch or the second switch.

8. The lighting device according to claim 1, wherein the control unit comprises any one or more of a micro-control unit, a Bluetooth control unit, a WIFI control unit and an infrared control unit; and wherein the control unit receives an external input signal indicating a light attribute, so as to output switch control signals to each switch pair.

9. A lighting device, comprising:

at least one filament group, wherein each filament group comprises at least one filament, each filament comprises at least one first light emitting unit and at least one second light emitting unit, which are connected in anti-parallel, and the first light emitting unit and the second light emitting unit have different colors from each other; and a color adjusting unit, which is connected to both ends of each filament group, so that the color of light emitted from the lighting device is switchable between the colors of different light emitting units;

wherein the color adjusting unit comprises a switch unit for receiving an external input signal to switch between different light emitting units for turn-on, so as to switch the color of the light emitted from the lighting device; and wherein the switch unit is a double-pole four-throw mechanical switch comprises a first pole, a second pole, a first fixed end, a second fixed end, and a first movable end to an eighth movable end, the first pole is connected to a positive end of a voltage via the first fixed end, and is switchable between the first movable end to the fourth movable end, so as to be connected to one end of the first light emitting unit or the second light emitting unit in one filament group of the lighting device via one of the first movable end to the fourth movable end, and the second pole is connected to a negative end of the voltage via the second fixed end, and is switchable between the fifth movable end to the eighth movable end, so as to be connected to the other end of the first light emitting unit or the second light emitting unit in the one filament group of the lighting device via one of the fifth movable end to the eighth movable end.

10. The lighting device according to claim 9, wherein, each filament group has a first end and a second end, each filament group comprises several identical filaments, and the several identical filaments are connected in series or in parallel; and the at least one filament group comprises a first filament group and a second filament group, any light emitting unit in the first filament group and any light emitting unit in the second filament group have different light attributes from each other, and at any timing, only the first light emitting unit or the second light emitting unit in one filament group in the lighting device is turned on, and the second end of the first filament group and the first end of the second filament group are connected to each other and are commonly connected to the color adjusting unit.

11. A lighting device, comprising:

a first filament group and a second filament group, wherein each filament group comprises at least one filament, each filament comprises at least one first light emitting unit and at least one second light emitting unit, which are connected in anti-parallel, the first light emitting unit and the second light emitting unit have different color temperatures from each other, any light emitting unit in the first filament group and any light emitting unit in the second filament group have different color temperatures from each other, and at any timing, only the first light emitting unit or the second light emitting unit in one filament group in the lighting device is turned on; and a double-pole four-throw mechanical switch, which is connected to both ends of each filament group, so that the color temperature of light emitted from the lighting device is switchable between the color temperatures of different light emitting units, wherein, the double-pole four-throw mechanical switch comprises a first pole, a second pole, a first fixed end, a second fixed end, and a first movable end to an eighth movable end, the first pole is connected to a positive end of a voltage via the first fixed end, and is switchable between the first movable end to the fourth movable end, so as to be connected to one end of the first light emitting unit or the second light emitting unit in one filament group of the lighting device via one of the first movable end to the fourth movable end, and the second pole is connected to a negative end of the voltage via the second fixed end, and is switchable between the fifth movable end to the eighth movable end, so as to be connected to the other end of the first light emitting unit or the second light emitting unit in the one filament group of the lighting device via one of the fifth movable end to the eighth movable end.

12. A method for adjusting a light attribute of a lighting device, wherein the lighting device comprises at least one filament group having a first end and a second end and (ii) comprising a first filament group having a first end connected to a first switch pair and a second end connected to a second switch pair, the first switch pair and the second switch pair each comprising a first switch and a second switch, and wherein each filament group comprises at least one filament, each filament comprises at least one first light emitting unit and at least one second light emitting unit, which are connected in anti-parallel, and the first light emitting unit and the second light emitting unit have different light attributes from each other; and the method comprises:

in response to an input signal from the outside indicating a light attribute of a first light emitting unit of the first filament group, adjusting a light attribute of light emitted from the lighting device by, controlling to turn on the first switch of the first switch pair and the second switch of the second switch pair, so that the first light emitting unit of the first filament group is turned on to emit light, or in response to the input signal from the outside indicating a light attribute of a second light emitting unit of the first filament group, controlling to turn on the second switch of the first switch pair and the first switch of the second switch pair, so that the second light emitting unit of the first filament group is turned on to emit light;

wherein the first switch and the second switch are electrically connected, the first switch is connected to a positive end of a voltage, the second switch is connected to a negative end of the voltage, and the first switch and the second switch are commonly connected to the first end or the second end of the filament group that is connected to the first switch pair and the second switch pair.

13. The method for adjusting the light attribute of the lighting device according to claim 12, wherein the step of adjusting the light attribute of the light emitted from the lighting device by controlling the light emitting state of each light emitting unit in the lighting device further comprises:

only controlling the on/off state of the first light emitting unit and the second light emitting unit in each filament group, so that the light attribute of the light emitted from the lighting device is switched between the light attributes of different light emitting units.

14. The method for adjusting the light attribute of the lighting device according to claim 12, wherein the step of adjusting the light attribute of the light emitted from the lighting device by controlling the light emitting state of each light emitting unit in the lighting device further comprises:

controlling the on/off state and a turn-on duration in the on-state of the first light emitting unit and the second light emitting unit in each filament group, so that the light attribute of the light emitted from the lighting device is different from the light attribute of any light emitting unit.

15. The method for adjusting the light attribute of the lighting device according to claim 14, wherein by controlling whether the first light emitting unit and the second light emitting in each filament group are in an on-state and a duty ratio of the turn-on duration in the on-state within one light emitting period, the light emitting units having different light attributes from each other in the lighting device are turned on alternately within one light emitting period, so as to generate an additional light attribute that is different from the light attribute of any light emitting unit.

* * * * *